United States Patent
Tiegs et al.

(10) Patent No.: US 8,745,965 B2
(45) Date of Patent: Jun. 10, 2014

(54) FLEXIBLE CABLE GUIDE

(75) Inventors: Detlef Tiegs, Bremen (DE); Sten Gatzke, Emtinghausen (DE)

(73) Assignee: Airbus Operations GmbH, Hamburg (DE)

( * ) Notice: Subject to any disclaimer, the term of this patent is extended or adjusted under 35 U.S.C. 154(b) by 29 days.

(21) Appl. No.: 13/476,189

(22) Filed: May 21, 2012

(65) Prior Publication Data

US 2012/0292074 A1 Nov. 22, 2012

Related U.S. Application Data

(60) Provisional application No. 61/488,634, filed on May 20, 2011.

(30) Foreign Application Priority Data

May 20, 2011 (DE) .......................... 10 2011 102 115

(51) Int. Cl.
*F16G 13/16* (2006.01)

(52) U.S. Cl.
USPC .................... 59/78.1; 59/900; 248/49; 248/51

(58) Field of Classification Search
USPC ................................. 59/78.1, 900; 248/49, 51
See application file for complete search history.

(56) References Cited

U.S. PATENT DOCUMENTS

| | | |
|---|---|---|
| 4,807,432 A | 2/1989 | Mauri |
| RE35,579 E * | 8/1997 | Moritz et al. .................. 59/78.1 |
| 6,107,565 A * | 8/2000 | O'Rourke ...................... 59/78.1 |
| 6,387,002 B1 | 5/2002 | Gunter |
| 6,550,232 B1 * | 4/2003 | Achs et al. ..................... 59/78.1 |
| 6,578,350 B2 * | 6/2003 | Blase et al. .................... 59/78.1 |
| 7,984,874 B2 | 7/2011 | Diergardt |
| 2010/0193642 A1 | 8/2010 | Crepin et al. |

FOREIGN PATENT DOCUMENTS

| | | |
|---|---|---|
| DE | 2220044 A1 | 11/1973 |
| DE | 8910220 U1 | 10/1989 |
| DE | 29704495 U1 | 4/1997 |
| DE | 102004062470 A1 | 11/2006 |
| DE | 102005061760 A1 | 7/2007 |
| DE | 102007003802 A1 | 8/2008 |
| EP | 0277389 A1 | 8/1988 |
| WO | 2009010431 A1 | 1/2009 |

OTHER PUBLICATIONS

German Patent Office, German Office Action dated Mar. 19, 2012 for German Patent Application 10 2011 102 115.2.

* cited by examiner

*Primary Examiner* — David B Jones
(74) *Attorney, Agent, or Firm* — Ingrassia Fisher & Lorenz P.C.

(57) ABSTRACT

A flexible cable guide is provided that includes, but is not limited to a first chain link with a first longitudinal axis, a front region and a tubular first inner surface that extends in longitudinal direction, and a second chain link with a second longitudinal axis, a rear region and a tubular second inner surface that extends in longitudinal direction. The front region of the first chain link is connected to the rear region of the second chain link pivotably about a pivoting axis that extends perpendicular to the longitudinal axes of the chain links, such that it can be pivoted leftward and rightward referred to the first longitudinal axis up to a maximum pivoting angle.

12 Claims, 4 Drawing Sheets

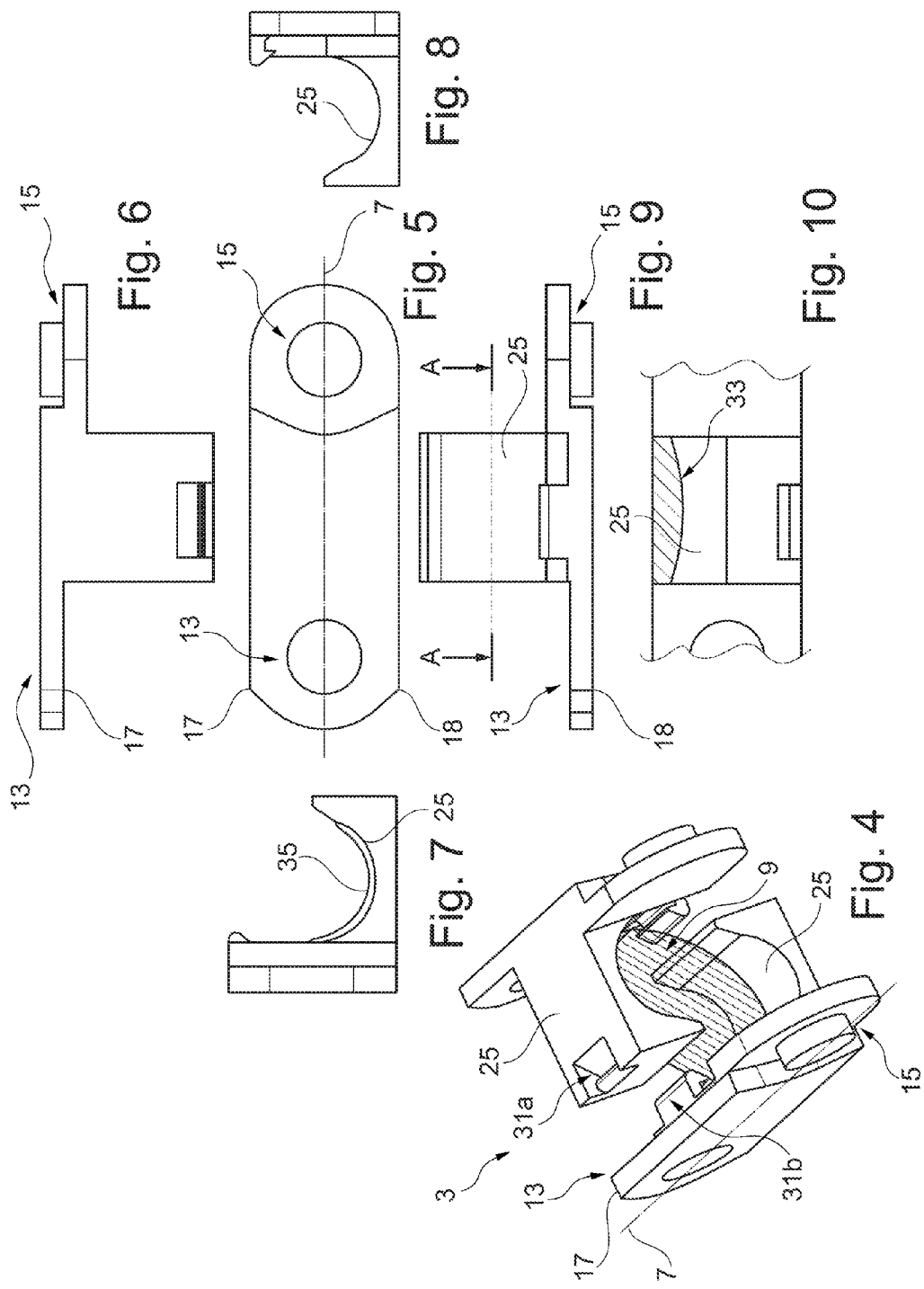

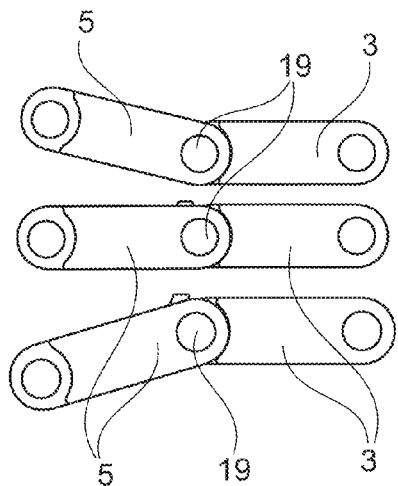
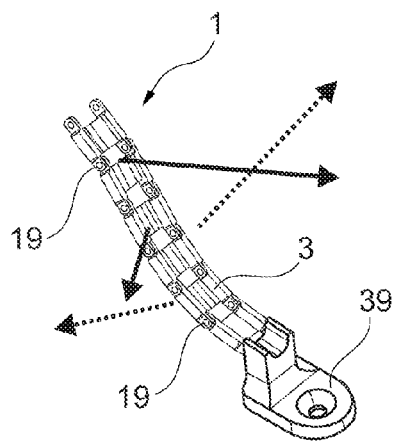
Fig. 12     Fig. 13
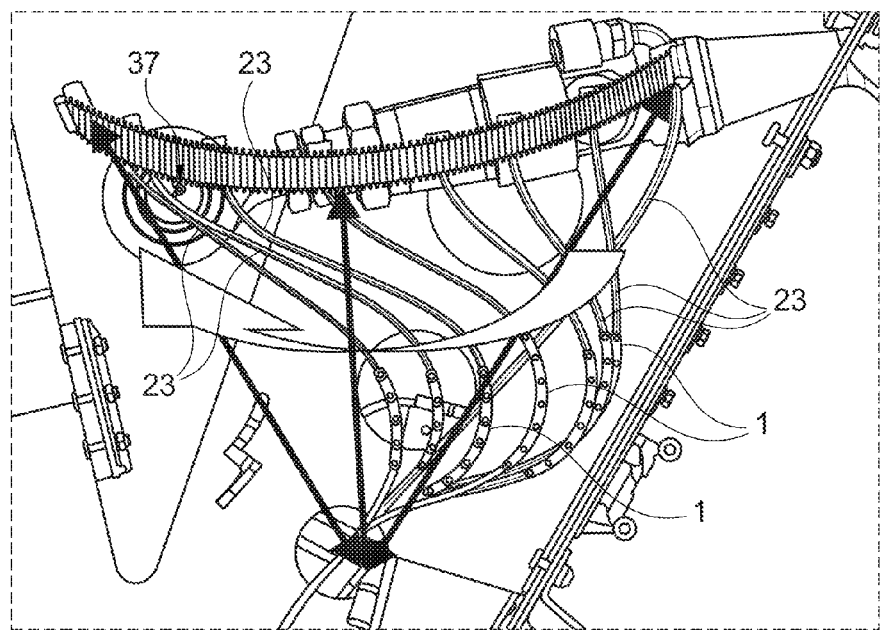
Fig. 14

FLEXIBLE CABLE GUIDE

CROSS-REFERENCE TO RELATED APPLICATIONS

This application claims priority to German Patent Application No. 10 2011 102 115.2, filed May 20, 2011 and to U.S. Provisional Patent Application No. 61/488,634, filed May 20, 2011, which are incorporated herein by reference in their entirety.

TECHNICAL FIELD

The technical field pertains to a flexible cable guide, an aircraft with a flexible cable guide, the utilization of a flexible cable guide in an aircraft and a method for manufacturing a series of flexible cable guides.

BACKGROUND

Machines are driven and controlled via cables in nearly all industrial fields. The cables may need to be installed as controlled as possible in order to ensure an optimal operation of the machines. The wiring of movable machine elements represents a particular challenge because the cables change their position and shape during the operation of the machine. A cable connection to movable elements is known from DE 10 2007 003 802 A1 and US 2008 179 456 A1.

On elements that carry out long-range and/or frequently repeated motions, the cables may become damaged. Furthermore, the cables may respectively become stuck on surrounding components or entangled with other cables.

Consequently, there may be a demand for an improved flexible cable guide that allows a sufficient motion of the cable, but simultaneously prevents the cable from becoming damaged and furthermore allows a controlled routing of the cable. In addition, other objects, desirable features and characteristics will become apparent from the subsequent summary and detailed description, and the appended claims, taken in conjunction with the accompanying drawings and this background.

SUMMARY

According to embodiment, a flexible cable guide is described that comprises a first chain link with a first longitudinal axis, a front region and a tubular first inner surface that extends in the longitudinal direction. The cable guide furthermore comprises a second chain link with a second longitudinal axis, a rear region and a tubular first inner surface that extends in the longitudinal direction. In this case, the front region of the first chain link is connected to the rear region of the second chain link pivotably about a pivoting axis that extends perpendicular to the longitudinal axes of the chain links. The pivoting motion may take place leftward and rightward referred to the first longitudinal axis up to a maximum pivoting angle. The maximum pivoting angle can be limited on the one hand by means of a first front stopping face of the front region of the first chain link that is spaced apart from a plane defined by the first longitudinal axis and the pivoting axis in a first direction. On the other hand, the maximum pivoting angle can be limited by means of a second front stopping face of the front region of the first chain link that can be spaced apart from this plane in a second direction extending opposite to the first direction.

In other words, the present teachings are based on the notion of realizing the flexible cable guide in such a way that it allows a sufficient motion of the cable, but may restrict the motion to one plane such that the cable is able, for example, to bend without becoming entangled with surrounding components and cables. The flexible cable guide is furthermore realized in such a way that the individual chain links can only be turned relative to one another in one direction and in the other direction referred to a longitudinal axis of the first chain link to such a degree that the bending radius of the cable does not fall short of its permissible bending radius. In this way, the cable may be prevented from being sharply bent. Generally, the design of the cable guide may make it possible to ensure a controlled motion of the cable, as well as a protection against abrasions or damages, and may prevent the bending radius of the routed cable from falling short of a specified bending radius.

The flexible cable guide may be used, for example, in the wiring of movable aircraft components such as, for example, aircraft flaps and corresponding sensors. In this case, the flexible cable guide may be structured, for example, like a chain and comprises several chain links. The cables to be routed may include, for example, fiber optic cables or electric cables.

The flexible cable guide comprises at least one first and one second chain link that, for example, may be realized identically. In this case, the first and the second chain link may be designed for respectively enclosing or accommodating a cable to be rounded in the interior of the chain link. To this end, the chain links comprise a first tubular inner surface that extends around the first longitudinal axis and a second tubular inner surface that extends around the second longitudinal axis. The inner surface may also be referred to as cable support and can be configured for accommodating and, if applicable, enclosing a cable. For example, the tubular inner surface may respectively enclose or have a round, oval or rectangular cross-sectional area. In this case, the cable guide may be configured for exactly accommodating one cable.

The first and the second chain link respectively have a longitudinal axis. In the elongated state of the cable guide, the longitudinal axes of the chain links coincide. In this case, the longitudinal axis corresponds to the direction of the largest dimension of a chain link. Furthermore, the longitudinal axes correspond to the direction, in which the cable guide extends in the elongated state.

The chain links can furthermore have a first and a second end region. The first end region may be referred to as front region and the second end region may be referred to as rear region. In this case, the end regions may respectively extend, for example, over about 10, 20 or 30% of the length of the chain link. The front region of the first chain link can be connected to the rear region of the second chain link pivotably about a pivoting axis. The front region of the first chain link may overlap with the rear region of the second chain link in this case. For example, the connection may be realized by means of a joint such as, for example, a pivot joint. In addition, the joint can move in a slide rail.

A first and a second stopping face can be provided on the front region of the first chain link. The stopping faces may limit the ability of the two chain links to move relative to one another. In this case, the motion of the chain links may take place in a plane extending perpendicular to the pivoting axis. If the first chain link is tightly held and the second chain link is turned, for example, the stopping faces may limit this motion to a certain maximum pivoting angle in the clockwise direction and in the counterclockwise direction referred to the longitudinal axis of the chain link. The first and the second front stopping face may be realized symmetrical relative to the plane defined by the first longitudinal axis and the pivoting axis. The front stopping faces furthermore may be realized symmetrical relative to the first longitudinal axis of the first chain link. In a symmetrical arrangement of the stopping faces, the maximum leftward and rightward pivoting angles about the longitudinal axis of the first chain link can be identical.

In this case, the pivoting angle may be the angle included between the first and the second longitudinal axis. In the straight or elongated state of the cable guide, the first chain link and the second chain link can be arranged in a straight line such that their longitudinal axes extend parallel to one another. The more the chain links are turned or pivoted relative to one another, the greater the relative incline between the longitudinal axes of the chain links and the greater the pivoting angle included by the longitudinal axes.

The connection of the chain links may control the degrees of freedom of the motion of the chain links such that, for example, a pivoting or turning motion about one axis can be realized. In this case, the connection or the joint is designed such that a pivoting motion may be possible in a plane that extends perpendicular to the plane defined by the first longitudinal axis and the pivoting axis.

The stopping faces arranged on the front region define a maximum pivoting angle, for example, in that they engage with the rear region of the second chain link and stop the turning motion. The stopping face may be realized, for example, in the form of a projection on the front region. When the maximum pivoting angle is reached, the projection can engage with a rear region of the second chain link in such a way that an additional turning or pivoting motion may not be possible. In this case, the projection may comprise, for example, of an elevation on the front region.

According to an exemplary embodiment, the rear region of the second chain link can feature a first rear stopping face and a second rear stopping face. At the maximum leftward pivoting angle referred to the first longitudinal axis, the first front stopping face of the front region of the first chain link contacts the first rear stopping face of the rear region of the second chain link. Furthermore, the second front stopping face of the front region of the first chain link contacts the second rear stopping face of the rear region of the second chain link at the maximum rightward pivoting angle referred to the first longitudinal axis.

The first and second rear stopping faces may also be referred to as locking faces and can be symmetrical relative to the plane defined by the second longitudinal axis of the second chain link and the pivoting axis. The rear stopping faces may be symmetrical, relative to the second longitudinal axis, for example.

In other words, the first front stopping face of the front region of the first chain link can define the maximum leftward or counterclockwise pivoting angle together with the first rear stopping face of the rear region of the second chain link. The second front stopping face of the front region of the first chain link can define the maximum rightward or clockwise pivoting angle together with the second rear stopping face of the rear region of the second chain link.

According to another exemplary embodiment, the first front stopping face, the second front stopping face, the first rear stopping face and the second rear stopping face at least sectionally extend at an acute angle of less than about 45° to a tangential direction referred to the pivoting axis.

In this case, the stopping faces may include, in particular, an angle of less than about 40°, about 30°, about 20° or about 10° with a tangent on a circle around the pivoting axis.

Alternatively, the front region of the first chain link may feature, for example, a first convex curvature on the first and the second stopping face. Furthermore, the front region of the first chain link may feature a second convex curvature in the region between the first and the second stopping face. The rear region of the second chain link may be realized with a concave curvature that is complementary to the first convex curvature. This means that the front region of the first chain link can be turned in the rear region of the second chain link. In this case, the second convex curvature may have a larger curvature radius than the first convex curvature and may not be complementary to the first concave curvature. This can make it possible to control the motion of the front region within the rear region.

According to another exemplary embodiment, the front stopping faces respectively are frictionally engaged with the rear stopping faces at the maximum pivoting angle.

In other words, the first front stopping face may, for example, become wedged or frictionally engaged with the first rear stopping face at a maximum leftward pivoting angle of the second chain link referred to the first longitudinal axis. In this way, the cable guide can be locked or tightly held in a position of maximum deflection of the chain links in one direction. This frictional connection between the stopping faces can be once again disengaged, for example, with a certain force in the direction of the longitudinal axis.

According to another exemplary embodiment, the first front stopping face of the front region of the first chain link and the second front stopping face of the front region of the first chain link can be mirror-symmetrical relative to the plane defined by the first longitudinal axis and the pivoting axis. In other words, the first front stopping face can be projected on the second front stopping face by means of perpendicular specular reflection on this plane. The symmetric design makes it possible to ensure that the maximum pivoting angle is equally limited in both directions about the longitudinal axis. According to another exemplary embodiment, the first chain link can be identical to the second chain link.

According to another exemplary embodiment, the first inner surface and/or the second inner surface at least sectionally has a circular or elliptical cross section for accommodating a cable. In this case, the first and/or second inner surface may feature a first region with a round cross section and a second region with an oval or rectangular cross section. Alternatively, the first and the second inner surface may have a continuously circular cross section.

According to another exemplary embodiment, the first inner surface and/or the second inner surface is at least sectionally curved toward the longitudinal axis in a convex fashion. In other words, the inner surface may have a convex curvature toward the longitudinal axis along the longitudinal axis of the chain link. This means that the inner surface respectively has a positive curvature toward the interior of the chain link or is curved toward the cable. For example, the first and the second inner surface may be realized in the form of saddles. In this way, the cable can be prevented from being sharply bent on or pressed against sharp edges of the chain link. In other words, the edges of the cable support are respectively rounded or realized conically in the direction of the longitudinal axis of the chain link. Consequently, the convex curvature enables the cable to bend without being sharply bent at a certain point of the cable on an edge.

According to another exemplary embodiment, the first inner surface and/or the second inner surface feature(s) can include an anti-friction coating. In this case, the anti-friction coating may be oriented toward the interior of the chain link, i.e., toward the cable. For example, the anti-friction coating may feature Teflon®. This makes it possible to prevent damages to the cable, for example, due to abrasion on the chain links.

According to another exemplary embodiment, the first chain link or all chain links respectively comprise two identical components. These two components can be assembled, for example, with the aid of a snap connection (click-and-snap connection). This allows a particularly simple manufacture and installation of the cable guide. The identical components may respectively feature part of the inner surface and part of the front and rear regions.

According to another exemplary embodiment, the identical components are realized in the form of injection-molded parts. Furthermore, the identical components respectively feature male and female connecting means that can engage into one another such that the two identical components can be connected to one another without additional adhesives or fasteners. For example, the identical components and therefore the chain links may be manufactured of plastic. This simplifies the manufacture and can save manufacturing and installation costs. Furthermore, the weight can be reduced due to the manufacture of the identical components of the chain links in the form of injection-molded parts and the elimination of additional connecting means. In this case, the connecting means may be realized in the form of a snap connection (click-and-snap connection).

According to another exemplary embodiment, the cable guide features a plurality of first chain links and a plurality of second chain links. All these chain links may be realized identically. In this case, the front region of the first chain link is respectively connected to the rear region of the second link.

According to another embodiment, an aircraft with a flexible cable guide of the above-defined type is described. In this case, the flexible cable guide can be used, for example, for routing cables on flaps such as, for example, Advanced Dropped Hinge Flaps (ADHF). A sensor arranged in the strut, in particular, can be wired with the aid of the flexible cable guide. This is particularly advantageous because an ADHF and the corresponding measuring sensors are highly mobile and therefore need to be provided with excessively long cables. Without a flexible cable guide, the cables could move in space and respectively be abraded or bent on the surrounding structure and become stuck.

According to another embodiment, a method for manufacturing a series of flexible cable guides of the above-defined type is described. In this case, the method can include: furnishing a first flexible cable guide with a first diameter of the first and second inner surfaces; furnishing a second flexible cable guide with a second diameter of the first and second inner surfaces. In the first flexible cable guide, the front region of the first chain link is connected to the rear region of the second chain link pivotably about a pivoting axis that extends perpendicular to the longitudinal axes, namely such that it can be pivoted leftward and rightward referred to the first longitudinal axis up to a first maximum pivoting angle. The chain links of the second flexible cable guide can be analogously pivoted up to a second maximum pivoting angle. In this case, the method furthermore includes: designing the first flexible cable guide and the second flexible cable guide in such a way that the ratio between the first maximum pivoting angle and the first diameter is identical to the ratio between the second maximum pivoting angle and the second diameter.

Consequently, different flexible cable guides can be manufactured for different cable diameters, wherein the cross-sectional area of the chain links respectively corresponds to a cable diameter and the maximum pivoting angle between the chain links is related to the cable diameter. In other words, the different cable guides may be realized such that the maximum pivoting angle decreases proportionally to an increasing diameter of the chain link or of the inner cross-sectional area of the chain link that is proportional to the diameter, respectively. This makes it possible to prevent the bending radius of a cable in the flexible cable guide from falling short of a minimum bending radius. For example, a minimum bending radius may amount to six-times the cable diameter. In this case, the maximum pivoting angle defined by the stopping faces respectively is reciprocally or inversely proportional to the cross-sectional area or to the diameter of the chain link. The cross-sectional area or the diameter of the chain link may be proportional to the dimension of the cable to be routed in this case.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 4 shows a perspective representation of a first chain link comprising two at least substantially identical components according to an exemplary embodiment;

FIG. 5 shows a side view of a component of the chain link according to FIG. 4;

FIG. 6 shows a bottom view of a component of the chain link according to FIG. 4;

FIG. 7 shows a view of a component of the chain link according to FIG. 4 from the right side;

FIG. 8 shows a view of a component of the chain link according to FIG. 4 from the left side;

FIG. 9 shows a top view of a component of the chain link according to FIG. 4;

FIG. 10 shows a top view of a cross section along the line A-A in FIG. 9;

FIG. 12 shows a side view of part of a flexible cable guide in different states of motion;

FIG. 13 shows a perspective representation of a flexible cable guide according to an exemplary embodiment; and FIG. 14 shows several flexible cable guides according to various exemplary embodiments on a sensor of an ADHF in an aircraft.

All figures merely show schematic representations of devices or their components, respectively. Particularly distances and proportions may not be depicted true-to-scale in the figures.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
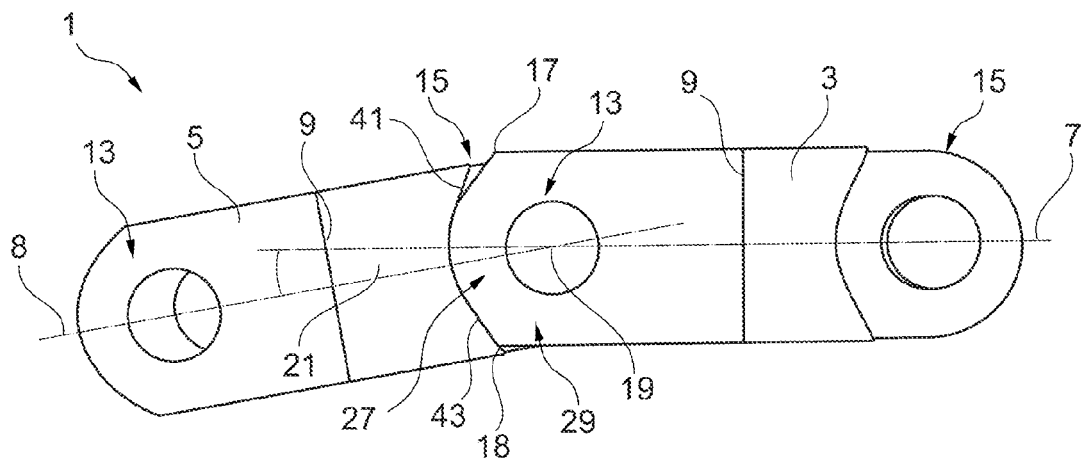
FIG. 1 shows a side view of part of a flexible cable guide according to an exemplary embodiment.
Figure 2:
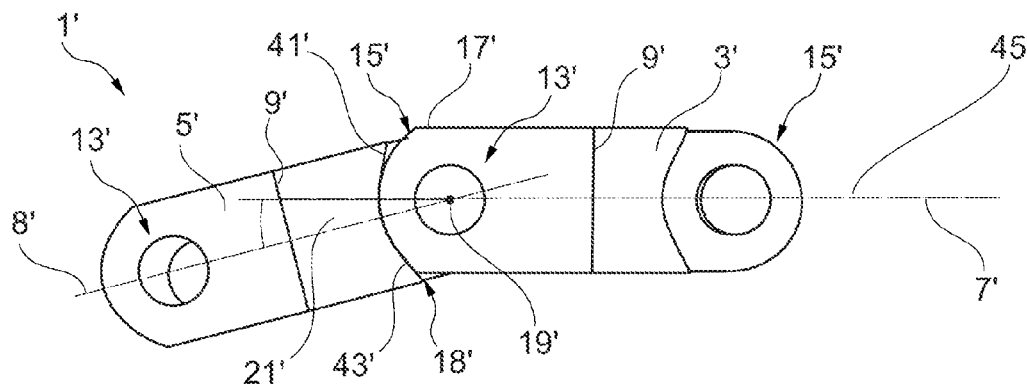
FIG. 2 shows a side view of part of a flexible cable guide according to an exemplary embodiment.
Figure 3:
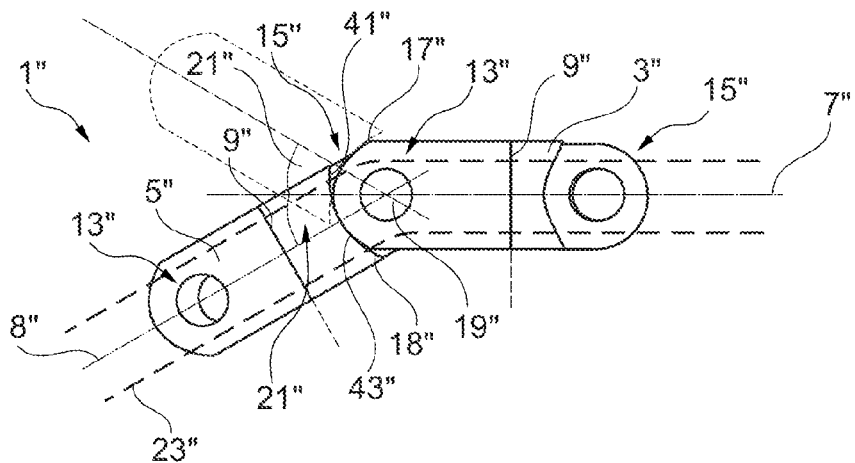
FIG. 3 shows a side view of part of a flexible cable guide according to an exemplary embodiment.

FIGS. 1 to 3 show side views of part of a flexible cable guide 1 according to different exemplary embodiments. In this case, FIGS. 1 to 3 show a series of flexible cable guides 1, 1' and 1" with different diameters or cross-sectional areas 9 and correspondingly differing maximum pivoting angles 21. In the different flexible cable guides 1, 1' and 1" illustrated in FIGS. 1 to 3, corresponding elements are identified by the same reference symbols and respectively indicated with no, one or two apostrophes. Although the reference symbols are predominantly used without apostrophes in the description, they may refer to any of the embodiments illustrated in FIGS. 1 to 3.

The flexible cable guide 1 features a first chain link 3 and a second chain link 5. In the exemplary embodiments, the chain links 3 and 5 are realized identically. In the exemplary embodiment according to FIG. 3, a cable 23 extending through the chain links 3, 5 is also illustrated with broken lines. The first chain link 3 has a first longitudinal axis 7, a cross-sectional area 9, a front region 13, a rear region 15, a first front stop 17 and a second front stop 18. The chain links are connected by means of a pivoting axis 19 that comprises, for example, a joint such that they can be respectively turned or pivoted relative to one another. In the exemplary embodiment, the pivoting axis 19 represents a rotational axis. The chain links 3, 5 can be turned or pivoted in a plane that extends perpendicular to the plane 45 defined by the first longitudinal axis 7 and the pivoting axis 19. In the illustrations in FIGS. 1 to 3, the plane 45 extends approximately into the image plane and is illustrated in an exemplary and schematic fashion in FIG. 2.

The first longitudinal axis 7 and the second longitudinal axis 8 form a pivoting angle 21. This pivoting angle is limited by the stopping faces 17, 18 in dependence on the dimension of the cross-sectional area 9 or the diameter of the inner surface 25, 26. The larger the cross-sectional area or the diameter of the cable 23 or the chain link 3, 5, the smaller the maximum pivoting angle 21 permitted by the stopping faces 17, 18. The maximum pivoting angle therefore can be indirectly proportional to the cross-sectional area of the chain link 3, 5.

The different exemplary embodiments illustrated in FIGS. 1 to 3 are designed for different cable diameters and therefore have different maximum pivoting angles 21, 21', 21". The part of a flexible cable guide 1 illustrated in FIG. 1 is designed, for example, for a cable that has a diameter of about 20 mm and a minimum bending radius of about 120 mm. The flexible cable guide 1' illustrated in FIG. 2 is suitable for a cable 23 that has a diameter of about 15 mm and a minimum bending radius of about 90 mm. The cable guide 1 illustrated in FIG. 3 is suitable for a cable diameter of about 10 cm with a minimum bending radius of about 60 mm. In the exemplary embodiment, the minimum bending radius R is greater than the diameter of the respective cable 23 by about a factor of six.

The larger the diameter of the cable 23 and therefore also the cross-sectional area 9 or the diameter of the inner surface 25, 26, the smaller the maximum pivoting angle 21 included by the longitudinal axes 7, 8. This is illustrated, for example, in FIG. 3. The maximum pivoting angle 21 is limited by front stopping faces 17, 18 on the front region 13 of the first chain link 3 that cooperate with rear stopping faces 41, 43 on the rear region 15 of the second chain link 5. Depending on the cable diameter and therefore also the cross-sectional area 9, the stopping faces 17, 18, 41, 43 are in this case constructed such that the bending radius of the cable 23 does not fall short of the minimum bending radius R.

In FIGS. 1 and 2, the second chain link 5 is deflected up to the maximum pivoting angle 21 leftward or counterclockwise referred to the first longitudinal axis 7 of the first chain link 3. Since the chain links are realized mirror-symmetrical referred to the plane 45, the second chain link 5 can be likewise deflected rightward or clockwise referred to the first longitudinal axis 7. This is indicated with broken lines in FIG. 3. The first front stopping face 17 is spaced apart from the plane 45 by a first distance in this case. The second front stopping face is spaced apart from the plane 45 by a second distance. With respect to its absolute value, the second distance can be identical to the first distance.

In the exemplary embodiments illustrated in FIGS. 1 to 3, the front region 13 of the first chain link 3 features a region 27 with a first convex curvature between the front stopping faces 17, 18. This curvature is complementary to the first concave curvature of the rear region 15 of the second chain link 5. This makes it possible to turn the chain links 3, 5 relative to one another. The stopping faces 17, 18 arranged in the front region 13 of the first chain link 3 furthermore have a second convex curvature, the curvature radius of which is larger than that of the first convex curvature. With respect to their curvature, the front stopping faces 17, 18 do not correspond to the concave curvature of the rear region 15. In this way, the front stopping faces 17, 18 of the front region 13 limit the ability to turn the chain links 3, 5 relative to one another. Rear stopping faces 41, 43 may furthermore be provided on the rear region 15 of the second chain link 5 and, for example, frictionally engage with the respective front stopping faces 17, 18 when the chain links 3, 5 are pivoted relative to one another by the maximum pivoting angle. The rear stopping faces 41, 43 may also be realized symmetrical referred to the plane 45.

FIGS. 4 to 10 show different views of a chain link 3, 5 or of components of a chain link 3, 5, respectively. A perspective representation of a chain link 3, 5 that can be assembled of two identical components is illustrated in FIG. 4. The cross-sectional area 9 extending perpendicular to the longitudinal axis 7 of the chain link 3, 5 is illustrated in a shaded fashion. The chain links 3, 5 have a round inner cross-sectional area 9 or a tubular inner surface 25 that corresponds to the cross section of the cable 23. According to FIG. 4, the flexible cable guide 1 or the individual chain links 3, 5 of the cable guide 1 are designed for enclosing a cable 23. The two identical components of the chain link 3, 5 can be assembled by means of a snap connection 31a, 31b.

The chain link 3, 5 according to the exemplary embodiment illustrated in FIG. 4 features two elongate sections that lie parallel to one another, wherein a pivoting axis 19 extends through the front and rear regions 13 and 15 of these elongate sections. For example, FIG. 5 shows a top view of one of the elongate sections. The inner surface 25, 26 has a curved cross section in the plane of the cross-sectional area 9. For example, the tubular inner surface 25, 26 corresponds to the circumference or the dimension of the cable 23 to be accommodated.

The inner surface 25, 26 also has a curvature in a plane 45 that is oriented perpendicular to the cross-sectional area 9. This is illustrated very clearly, for example, in FIG. 10. The bulge or convex curvature of the inner surface 25 toward the interior of the chain link 3, 5 is identified by the reference symbol 33.

FIGS. 5 to 10 respectively show different views of the lower left component of the chain link 3, 5 according to FIG. 4. In this case, FIG. 5 shows a side view of the component. FIG. 6 shows a bottom view and FIG. 9 shows a top view of this component. FIG. 7 shows a view of the component according to FIG. 4 from the right side and FIG. 8 shows a view of this component from the left side. In the exemplary embodiment illustrated in FIG. 7, an anti-friction coating 35 is shown on the side of the tubular inner surface 25 that faces a cable 23.

Figure 11:
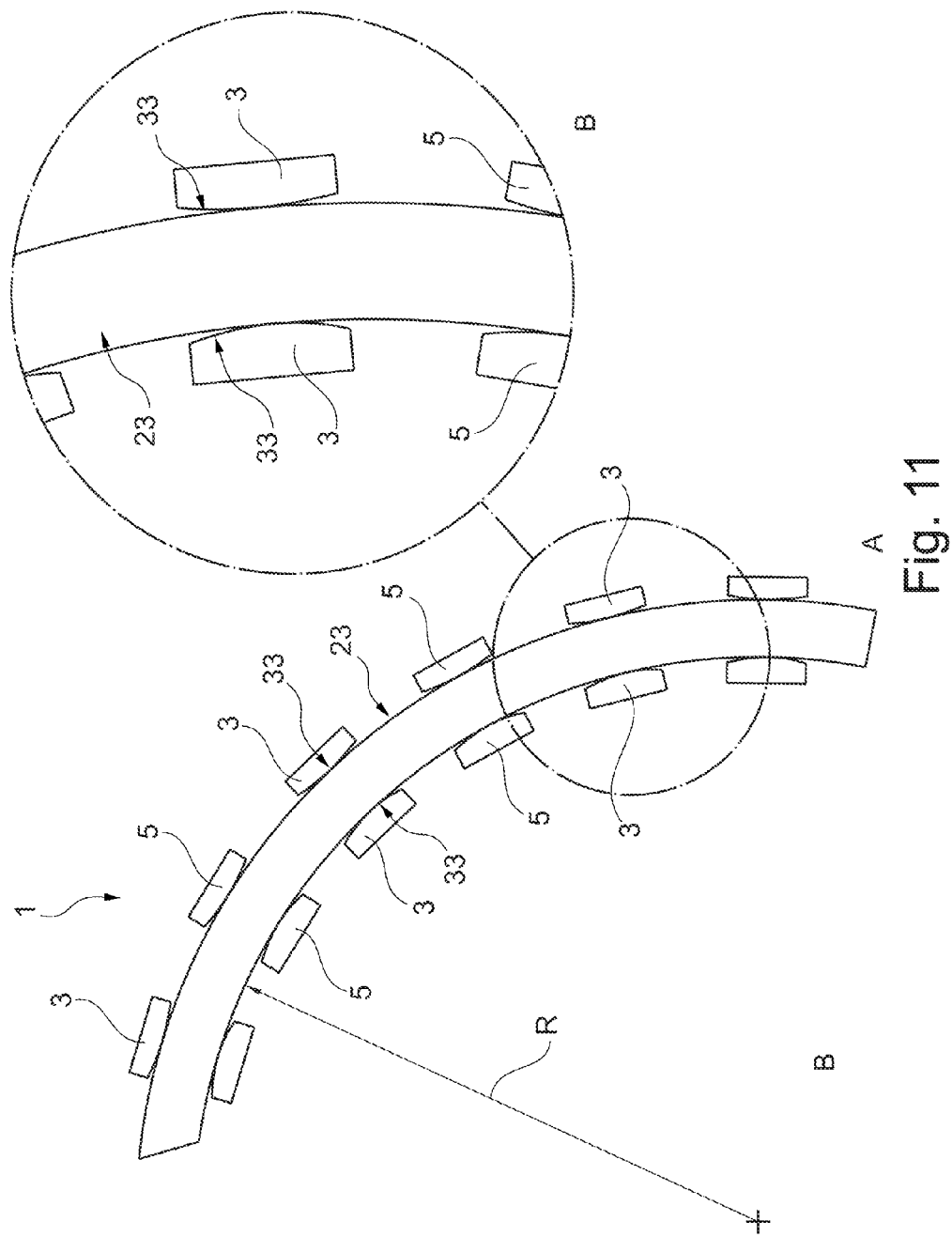
FIG. 11A shows a cross section through a flexible cable guide with a cable, where the cross section extends through the plane illustrated in FIG. 10.
FIG. 11B shows an enlarged representation of the area marked with a circle in FIG. 11A.

FIGS. 11A and B show a cross section through a flexible cable guide 1 according to another exemplary embodiment. In this case, the cross section extends through the plane illustrated in FIG. 10. The convex curvature 33 of the cable support 25 in this plane is once again illustrated in FIG. 10. This convex curvature 33 enables the cable 23 to bend without being sharply bent at a certain point of the cable 23 on an edge. The minimum bending radius R of the cable 23 is illustrated in FIG. 11B.

FIG. 12 shows three details of a flexible cable guide 1. Different states of motion are illustrated in these details. The cable 23 situated in the cable guide 1 can move in the plane defined by the cable guide 1, i.e., upward and downward, generally up to the permissible bending radius R of the cable 23.

FIG. 13 elucidates the ability to move the flexible cable guide 1 in one plane extending perpendicular to the pivoting axes 19 that are also referred to as link axes. The possible moving direction is indicated with continuous arrows. The dotted arrows indicate moving directions that are precluded by the flexible cable guide.

FIG. 14 shows an exemplary application of the flexible cable guide 1 on a sensor 37 of an ADHF in an aircraft. The sensor can control the movement of the flap in the flow direction. For this purpose, the sensor 37 moves within a range of up to about 600 mm. The sensor 37 is provided with several cables 23, the length of which may be extremely shortened, for example, in the center of the sensor displacement path. If the cables are not routed through a flexible cable device 1, they may abrade, be bent or become stuck on the surrounding structure. The arrows in FIG. 14 indicate the extent of the mobility of the sensor 37.

Due to the flexible cable guide 1, the individual cables 23 are routed to the sensor 37 in a controlled fashion such that the cables move in the plane defined by the cable guide 1 and do not become entangled. In the illustration according to FIG. 14, the plane defined by the flexible cable guide 1 is the image plane. The flexible cable guide 1 furthermore ensures that the chain links turn relative to one another to such a degree that the bending radius of the cable 23 does not fall short of the permissible bending radius R.

In this case, the flexible cable guide 1 can be fastened on the last mounting point of the rigid installation. A corresponding fastening element 39 is illustrated in FIG. 13. On the other end, the flexible cable guide 1 follows the moving sensor 37.

In conclusion, it is noted that terms such as "comprising" or the like are not intended to exclude other elements or steps from being provided. It is also noted that "a" or "an" does not exclude a plurality. In addition, characteristics described in connection with the different embodiments may be arbitrarily combined with one another. It is furthermore noted that the reference symbols in the claims should not be interpreted in a restrictive sense with respect to the scope of the claims. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A flexible cable guide comprising:
a first chain link with a first longitudinal axis, a front region and a tubular first inner surface that extends along the first longitudinal axis; and
a second chain link with a second longitudinal axis, a rear region and a tubular second inner surface that extends along the second longitudinal axis,
wherein the front region of the first chain link is connected to the rear region of the second chain link pivotably about a pivoting axis that extends perpendicular to the first and second longitudinal axes of the first and second chain links, such that it can be pivoted counterclockwise and clockwise relative to the first longitudinal axis up to a maximum pivoting angle,
wherein the maximum pivoting angle is defined with a first front stopping face of the front region of the first chain link that is spaced apart from a plane defined by the first longitudinal axis and the pivoting axis in a first direction and with a second front stopping face of the front region of the first chain link that is spaced apart from the plane defined by the first longitudinal axis and the pivoting axis in a second direction extending opposite to the first direction, and
wherein at least one of the first inner surface and the second inner surface at least sectionally has a circular or elliptical cross section for accommodating a cable.

2. The flexible cable guide of claim 1,
wherein the rear region of the second chain link comprises a first rear stopping face and a second rear stopping face such that counterclockwise pivoting relative to the first longitudinal axis by the maximum pivoting angle causes the first front stopping face of the front region of the first chain link to engage on the first rear stopping face of the rear region of the second chain link and clockwise pivoting relative to the first longitudinal axis by the maximum pivoting angle causes the second front stopping face of the front region of the first chain link to engage on the second rear stopping face of the rear region of the second chain link.

3. The flexible cable guide of claim 2,
wherein the first front stopping face, the second front stopping face, the first rear stopping face and the second rear stopping face at least sectionally extend at an acute angle of less than about 45° to the tangential direction relative to the pivoting axis.

4. The flexible cable guide of claims 2,
wherein counterclockwise pivoting relative to the first longitudinal axis by the maximum pivoting angle causes the first front stopping face of the front region of the first chain link to frictionally engage on the first rear stopping face of the rear region of the second chain link and clockwise pivoting relative to the first longitudinal axis by the maximum pivoting angle causes the second front stopping face of the front region of the first chain link to frictionally engage on the second rear stopping face of the rear region of the second chain link.

5. The flexible cable guide of claim 1,
wherein the first front stopping face of the front region of the first chain link and the second front stopping face of the front region of the first chain link are mirror-symmetrical relative to the plane defined by the first longitudinal axis and the pivoting axis.

6. The flexible cable guide of claim 1,
wherein the first chain link and the second chain link are identical.

7. The flexible cable guide of claim 1,
wherein at least one of the first inner surface and the second inner surface features an anti-friction coating.

8. The flexible cable guide of claim 1,
wherein at least one of the first chain link and the second chain link includes at least two identical components.

9. The flexible cable guide of claim 8,
wherein the at least two identical components are injection-molded parts and respectively feature male and female connecting elements that engage into one another such that the at least two identical components can be connected directly to one another.

10. The flexible cable guide of claim 1,
wherein the cable guide comprises a plurality of first chain links and a plurality of second chain links.

11. The flexible cable guide of claim 1, wherein the flexible cable guide is installed on an aircraft.

12. A method for manufacturing a series of flexible cable guides, comprising:
providing a first flexible cable guide comprising a plurality of chain links, each chain link including a, first inner surface and second inner surface having a first diameter, and connecting a front region of a first chain link of the first flexible cable guide to a rear region of a second chain link of the first flexible cable guide pivotably about a pivoting axis that extends perpendicular to a first longitudinal axis, such that it can be pivoted counterclockwise and clockwise relative to the first longitudinal axis up to a first maximum pivoting angle;
providing a second flexible cable guide comprising a second plurality of chain links, each chain link including a first inner surface and a second inner surface having a second diameter, and
connecting a front region of a first chain link of the second flexible cable guide to a rear region of a second chain link of the second flexible cable guide pivotably about a pivoting axis that extends perpendicular to a second longitudinal axis, such that it can be pivoted counterclockwise and clockwise relative to the second longitudinal axis up to a second maximum pivoting angle; and
forming the first flexible cable guide and the second flexible cable guide so that the ratio between the first maximum pivoting angle and the first diameter is identical to the ratio between the second maximum pivoting angle and the second diameter.

* * * * *